United States Patent [19]

Neidell

[11] 4,315,263

[45] Feb. 9, 1982

[54] NAVIGATIONAL SYSTEMS USING PHASE ENCODED ANGULAR COORDINATES

[76] Inventor: Norman S. Neidell, 13054 Taylorcrest, Houston, Tex. 77079

[21] Appl. No.: 76,695

[22] Filed: Sep. 18, 1979

Related U.S. Application Data

[63] Continuation of Ser. No. 925,903, Jul. 19, 1978, which is a continuation-in-part of Ser. No. 691,674, Jun. 1, 1976, Pat. No. 4,114,153, which is a continuation of Ser. No. 483,202, Jun. 26, 1974, abandoned.

[51] Int. Cl.³ .............................................. G01S 3/02
[52] U.S. Cl. ......................... 343/112 C; 343/100 CL
[58] Field of Search ............ 343/100 CL, 9 R, 112 C, 343/112 R; 367/90, 100

[56] References Cited

U.S. PATENT DOCUMENTS 4,028,699 6/1977 Stevens .................................. 343/9

Primary Examiner—Theodore M. Blum
Attorney, Agent, or Firm—Pravel, Gambrell, Hewitt, Kirk, Kimball & Dodge

[57] ABSTRACT

This invention generally relates to navigation systems which seek to position in real time with appropriate accuracy one or more mobile platforms in reference to a known system of coordinates by the emission of signals into a propagation medium and processing them after detection. Broad-band, broad-beam signals are employed. All received signals convey phase encoded angular coordinate information which characterizes the particular signal path. When the angular coordinate information is used in conjunction with range determinations from detected signals, an especially useful navigation system is provided which can operate using only a single reference station.

18 Claims, 10 Drawing Figures

NAVIGATIONAL SYSTEMS USING PHASE ENCODED ANGULAR COORDINATES

REFERENCE TO RELATED APPLICATION

This application is a continuation of co-pending U.S. Patent Application Ser. No. 925,903, filed July 19, 1978 which is a continuation-in-part of my copending U.S. Patent Application Ser. No. 691,674, filed June 6, 1976 now U.S. Pat. No. 4,114,153, dated Sept. 12, 1978 which in turn is a continuation of prior co-pending U.S. Patent Application Ser. No. 483,202 filed June 26, 1974 and now abandoned.

BACKGROUND OF THE INVENTION

According to Karwarth in the *Journal of the Institute of Navigation*, Vol. 24, No. 1, pp. 105-120, Jan. 1, 1971, the basic objective of area navigation is to position in real time with appropriate accuracy one or more mobile units with reference to some known coordinate system. The number of coordinates needed depends upon whether the course of the mobile unit can be charted on a known surface or must be described in three-dimensional space as in the respective cases of a ship at sea and an aircraft. The ability to chart a course based on past, present and future desired positions is a principal element in distinguishing an area navigation system from navigation using point-to-point or "homing" approaches such as VOR/DME (VHF Omnidirectional Range/Distance Measuring Equipment).

Positions are established in all cases by signal transmission between the mobile units and at least one transmitter of known location. The transmissions can be electromagnetic (including optical) or acoustic in any medium including air. Two basic methods are normally used to obtain positions:

Positions may be determined from a sufficient number of range measurements to known reference locations by using what is commonly known as "range-range" systems, or positions may be determined from a sufficient number of range differences to known reference locations, by using what is commonly known as "hyperbolic" systems. In each case a sufficient number is at least equal to the number of coordinate values needed.

Direct ranging involves calculation of intersections of the circles or spheres of uniform range from each reference location to the mobile unit. By contrast, the locus of equal range difference from the mobile unit to a pair of reference locations are hyperbolae or hyperbolae of revolution. Again, positions are calculated by intersection of curves or surfaces, but in this case related to hyperbolae, hence the name hyperbolic systems.

An exemplary task of area navigation might be the positioning of a ship at near shore distances. In range-range operation only two shore stations are needed while a hyperbolic system requires three. Three shore stations admit calculation of three range differences hence providing some element of data redundancy. As a general rule, hyperbolic systems offset a disadvantage in requiring one more known reference location than the simplest operable ranging system by having some degree of data redundancy.

As for the transmitted signals, a variety of differing modes of operation are possible. Ranges can be determined from signal transmission time between the mobile unit and a reference location if the signal initiation time is known, a time standard is available, and a signal propagation velocity is also known. The simplest means for establishing known initiation times is to transmit signals only in response to some interrogation. Alternatively, if transmissions are synchronized to occur at regular time intervals, time differences are readily determined with no interrogation step needed using only a local time standard and a propagation velocity.

Again, signal transmissions themselves can consist of continuous waveforms (typically sinusoids), intervals of continuous signal transmissions, or sequences of pulses. The choice of transmitted signal reflects consideration of the information desired, mode of operation (range-range versus hyperbolic), noise effects, and the extent of Doppler distortions amongst other factors.

Continuous waveforms are the most robust signals in the presence of noise backgrounds since correlation-type receivers may take advantage of the extreme signal duration. Such signals have no resolution in time and are used principally with hyperbolic systems to establish time-differences by making phase comparisons with reference signals. Where the transmitter-receiver relative velocity is not insignificant in proportion to the signal propagation velocity, Doppler effects shift the frequencies of continuous waveforms. Frequency shifts may be viewed as errors since they distort subsequent correlation steps and thus degrade phase comparisons, however, if such shifts are measured, they do relate to velocity information should this be desired.

Use of continuous signals over intervals provides time resolution as well as opportunities for correlation detection, but over shorter data windows. Again, any Doppler effects may be viewed either as constituting an error in range determination or if measured, velocity information. The tolerance of such signals to noise effects is of course diminished in direct proportion to their shortened duration.

In the limit, as duration is shortened, pulsed signals must be considered which when taken individually offer no opportunity to measure Doppler effects. Hence significant transmitter-receiver relative velocities will be noted as range errors for such systems. These signals are also most affected by the presence of noise, but afford the greatest resolution in making a direct time measurement.

It follows that the alternative methods of operations which exist constitute attempts at optimizing a number of trade-offs which interact with some complexity. The hardware requirements, operation costs, efficiencies and effectiveness in terms of achievable accuracy are all essential ingredients which play roles in the optimization.

The following Table presents a sampling of a number of commercially available area navigation systems. A much more detailed and comprehensive tabulation of short and medium range electromagnetic position fixing systems was presented by Rear Admiral C. Munson at the XV Annual Congress of Surveyors, Stockholm, June 1977. The variety of candidate systems gives insight into the way in which the optimization problem has been addressed. Navigation systems based on the present invention may serve as replacements for each of the systems noted in the following table amongst others.

TABLE OF REPRESENTATIVE COMMERCIAL AREA NAVIGATION SYSTEMS

| Company | System and Model | Operating Mode and Environment | Frequency | Range (nm.) |
|---|---|---|---|---|
| Alpine Geophysical Assoc. Inc. Norwood, N.J. | SUNS (Sonic Underwater Navigation system) Model 775 | 3 transponders-underwater ranging | 11 khz. transducer 13, 14, 15 khz. transponders. | 6 |
| Cubic Corporation San Diego, Ca. | Autotape Model DM-40 (Electronic Positioning system) | Interrogator and 2 responders - surface ranging | 2900-3100 mhz. | 93 |
| Decca Survey Systems Inc. Houston, Tx. | Pulse/8 | Receiver and 3 or more transmitters - hyperbolic or ranging | 100 khz. | 300+ |
| | Long Range Shoran | Receiver and 2 or more transmitters - surface ranging | 300-400 mhz. | 200+ |
| | Hi-Fix/6 | Receiver and 2 or more transmitters - hyperbolic or ranging | 1.6-5.0 mhz. | 100+ |
| | Sea-Fix | Receiver and 2 or more transmitters - hyperbolic or ranging | 2 mhz. | <100 |
| | Trisponder | Mobile station and at least two remotes - surface ranging. | Microwave (X Band). 9350 mhz. (mobile) 9450 mhz. (remote) | <50 |
| | Aquafix | Surface transmitter with bottom transponders or hydrophone with radio link - slant ranging | 10.5-16 khz. | <1 |
| del Norte Technology, Inc. Euless, Tx. | Trisponder Model 202a | Mobile master and two slaves - surface ranging | Microwave (X Band) 9450 mhz | <50 with extension to <150 |
| Motorola, Scottsdale, Arizona | RPS (Range Positioning System) | Receiver/Transmitter and two or more Radar transponders - surface ranging | Microwave (X Band) 9300-9500 mhz. | 50 extension to 100 |
| | Mini-Ranger III System | Receiver/Transmitter and two or more Radar transponders - surface ranging | Microwave (X Band) 5450-5600 mhz. | <20 extension to <100 |
| Ocean Research Equipment, Inc. Falmouth, Mass. | Transnav 6000 Acoustic Navigation System | Transducer and four transponders - surface and under-water ranging | 7.5 (on board) or 8.57 (submarine)khz transducer 10.75, 11.25, 12.25 khz transponders | approx. 12 |
| Teledyne Hastings-Raydist, Hampton, Va. | Raydist-76 System and DRS-H System | Mobile station and two or three shore stations - ranging and hyperbolic (for 3rd station) | 1600-4000 khz | approx. 200 day-time approx. 120 night-time. |

SUMMARY OF THE INVENTION

This invention relates to navigation systems which employ phase encoded angular coordinate information in transmitted signals. The technology for this invention can conveniently employ the methods described in my above-referenced patent, which is incorporated herein by reference.

Component signal trains of member signals convey all of the navigational information. The component signals which may be concurrently propagating are always separable and distinguishable from one another by some combination of frequency content, polarization character, and member signal pattern. Member signals are required to have four basic properties.

Broad beam transmitters produce the component signals which illuminate the navigation area. Broad beam receivers detect these signals. Angular coordinate information is phase encoded in member signals by reflective or transmissive mechanisms. All encodings can be substantially characterized by a phase distortion consisting of a constant and a second complementary constant which multiplies the frequency. This approximation produces the first two terms of a Taylor series developed over frequency, the independent variable.

Angular coordinates are referred either to receiver or transmitter locations, and either the receiver or the transmitter can constitute the known location, depending on the particular embodiment. Component signal transmissions can be sent in response to interrogation, at regular time intervals or at random, depending on the selected mode of operation. In all cases the angular coordinate information will be conveyed.

Processing the received component signals to identify member signals may be described by a phase-invariant quadrature matched-filtering operation which is described in my referenced patent. Member signal basic properties and such processing of the received component signals are complementary in that frequency shifts resulting from relative motion between the transmitter and receiver do not affect arrival time measurements nor the phase encoded angular coordinate information.

Relative velocity component information between mobile units and the known location and radial range information may also be conveyed by the component signals. Such determinations are possible if the initial interval time between member signals, the time of member signal transmission, the signal propagation velocity, and a time standard are known. Having both range and angular coordinate information allows development of a navigation system which can operate using only a single base station.

Since utilization of phase information is the essence of the invention, several corrections to compensate for phase distortions are included. Distortions accompanying member signal design and entering during processing are some which fall in this category.

The broad beam nature of the transmitters used in this invention suggests lower signal energy levels than might be achieved with a narrow beam system. Rapid repetition of these broad beam signals can however overcome this deficit. Further, the ability to impart angular coordinate information offers opportunities to overcome the ambiguities of skywave reflections in electromagnetic embodiments and multipath reflections in sonar applications.

Advanced embodiments of the invention can allow initial mobile units to position other mobile units with respect to themselves once the units have established their locations. The initial mobile units accomplish this function by using echoes or reflections from the other mobile units and function in this case as an echo-location system which is described in my referenced patent.

Finally, by encoding sufficient redundancy in the member signals, any phase distortions imparted by the propagation medium may be measured as a part of the decoding operation. This feature adds significantly to the robustness of the method of this invention. Such distortions are illustrated with previously unpublished results. The phase distortion for sound waves caused by propagation in water for frequencies in the vicinity of 1.2 mhz is characterized as a function of the propagation path length by the methods of this invention.

DETAILED DESCRIPTION OF THE INVENTION

Figure 1:
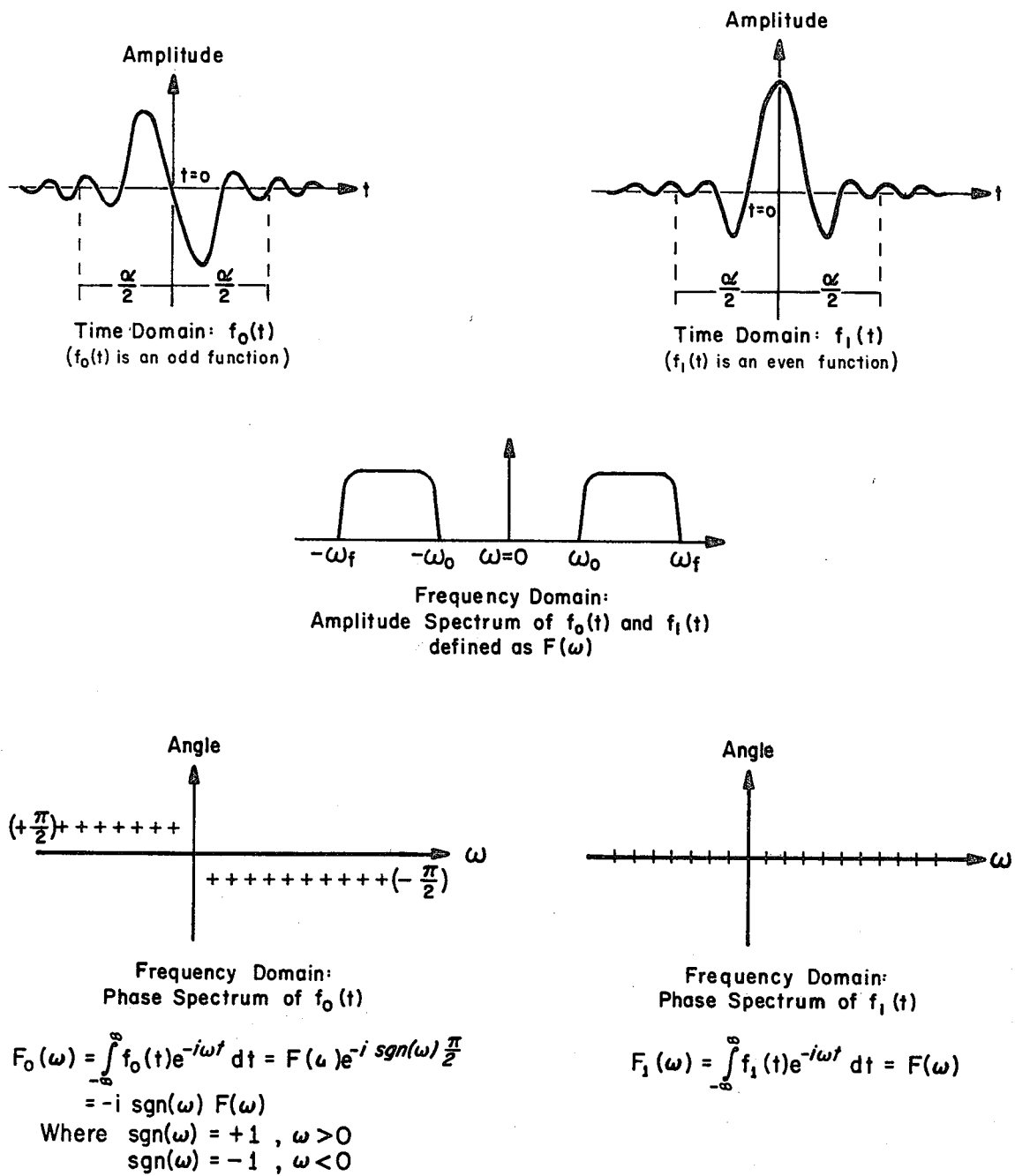
FIG. 1 shows the time and frequency domain properties of a design base signal pair having respectively odd and even symmetry.

FIG. 1 shows a pair of base signals from which a member signal may be designed. A single member signal is formed as a linear combination of a pair of base signals as defined in my above-referenced patent. In mathematical terms we shall call this signal $$f(t) = mf_0(t) + nf_1(t), \qquad (1)$$

where m and n are constants obeying the relationship $m^2 + n^2 = 1$, and $f_0(t)$, $f_1(t)$ represent the base signals.

The four requisite properties I–IV of the base signals $f_0(t)$ and $f_1(t)$ are:

I. $f_0(t)$ and $f_1(t)$ share the common amplitude spectrum F(w) which is substantially flat or smoothly unimodal over both its continuous bands at positive and negative frequencies and is essentially zero elsewhere.

II. There is a finite time interval of duration $\alpha$, before and after which both $f_0(t)$ and $f_1(t)$ may be considered to be zero, or $f_0(t)$ and $f_1(t)$ are pulses.

III. $f_0(t)$ and $f_1(t)$ are in quadrature or constitute a Hilbert transform pair. In other words, at each common frequency component the signals differ in phase by 90°.

IV. $f_0(t)$ and $f_1(t)$ must be transformable to odd and even functions respectively about t=o, defined as the central coordinate value in their interval of definition of duration $\alpha$, by a constant phase shift applied to all frequencies.

Signals termed Klauder signals and Gabor signals described in my above-referenced patent are in fact two representative types of signals appropriate for use as the base signals $f_0(t)$ and $f_1(t)$. Mathematically these two signal types are defined as:

Klauder Signals $k_0(t), k_1(t)$ (2A)

$$k_0(t) = A \frac{\cos w_f t - \cos w_0 t}{(w_f - w_0)t}$$

$$k_1(t) = A \frac{\sin w_f t - \sin w_0 t}{(w_f - w_0)t}$$

$w_0$, $w_f$ and $A$ are constants, and $$k_0(t) = k_1(t) = 0 \text{ for } |t| \geq \frac{\alpha}{2}$$

Gabor Signals $g_0(t), g_1(t)$ (2B)

$$g_0(t) = A \frac{\left(\frac{t}{t_0}\right)}{1 + \left(\frac{t}{t_0}\right)^2}$$

$$g_1(t) = A \frac{1}{1 + \left(\frac{t}{t_0}\right)^2}$$

$t_0$ and $A$ are constants, and $$g_0(t) = g_1(t) = 0 \text{ for } |t| \geq \frac{\alpha}{2}$$

Returning now to FIG. 1 (which corresponds to FIG. 12 of my referenced patent), it shows a diagram of the time domain and Fourier frequency domain properties of the Klauder base signal pair termed $f_0(t)$, $f_1(t)$ (refer to Equation (2A)) which illustrate the four requisite properties (I through IV) for base signals.

Figure 2:
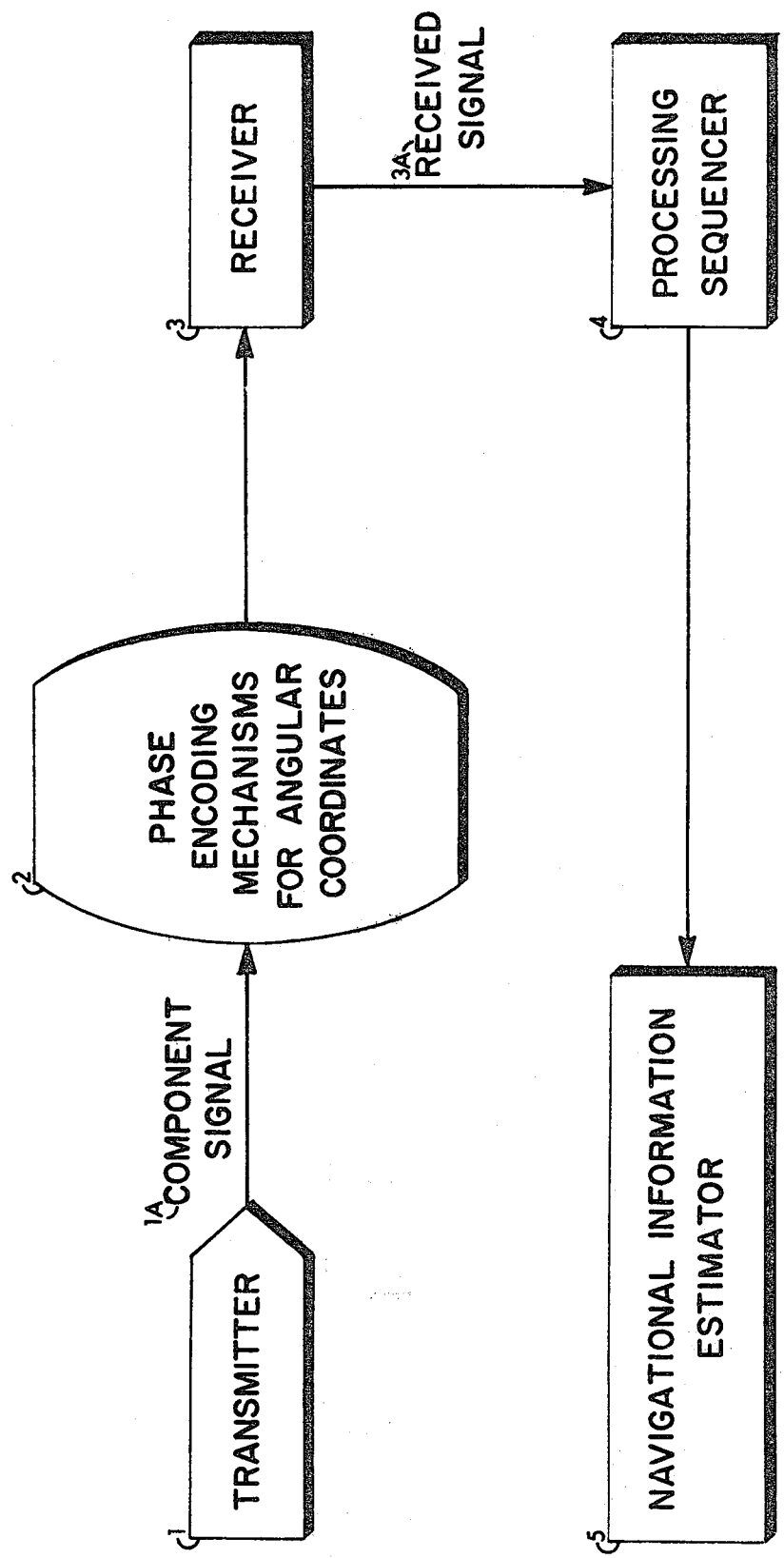
FIG. 2 shows a generalized embodiment of the invention having a single transmitter and receiver.

FIG. 2 shows a generalized embodiment of the invention which employs a single transmitter 1 and receiver 3. The transmitter 1 produces at least one component signal 1A. A component signal is a train of member signals which is always separable and distinguishable from other component signals by some combination of frequency content, polarization character and member signal pattern. In cases such as for sonar signals where the polarization character is alike for all signals, the polarization character drops out as a possible distinguishing feature. A discussion on polarization character or state is presented by A. S. Marathay in Optical Engineering, Vol. 15, No. 4, p. SR 80–81, July–August, 1976.

For the navigation system of FIG. 2, it is required that a transmitted component signal 1A be received directly, but that somewhere along the propagation path a mechanism interacting with the signal phase be encountered. Such an element can be a phase lens or phase encoding mechanism. Element 2 performs this function. The component signal 1A which propagates with known velocity encounters the phase encoding mechanism 2 and is subsequently received by the receiver 3. The received component signal 3A is forwarded to the processing sequencer 4 and processing outputs are sent on to the navigational information estimator 5.

The role of the phase encoding mechanism 2 is to encode in each member signal information about one or more angular coordinates as a phase distortion. Also, the phase distortion for each angular coordinate must be unambiguously related to that coordinate. Further, the phase distortion over the applicable frequency band must be representable in good approximation by:

$$G(w) = \theta_o + \theta_1 w \qquad (3)$$

where, $\theta_o$ is a constant phase, $\theta_1$ is a complementary constant multiplying the angular frequency w.
The code for the angular coordinate is contained in the explicit relation between the coordinate and G(w).

Property I as given earlier for the underlying base signals must be substantially retained even after the action of the phase encoding mechanism 2. Equation (3) should also be recognized as the first two terms of a Taylor series expansion. Hence the character of this approximation is based upon development of the received member signal phase spectrum as a Taylor series with truncation of the series after the second term. For the $i^{th}$ member signal of a component signal, the following notation will be used:

$$\theta_{io} + \theta_{il} w$$

to approximate the measured phase.

Phase encoding mechanisms of the type desired may be reflective in nature as well as transmissive. A simple reflective encoding mechanism which is described exactly by equation (3) is well known. If the transmitted signal is reflected for some range of angles which are all beyond the critical angle for the particular reflective surface, a frequency independent phase encoding $\theta_{io}$ is imposed which will vary with the particular incidence angle. For this case $\theta_{il}$ will be identically zero for all of the allowable incidence angles. See the discussion "3-2: Reflection of a Pulse Incident Beyond the Critical Angle" commencing on page 90 of Ewing, Jardetzky, and Press, *Elastic Waves in Layered Media*, Lamont Geological Observatory contribution No. 189, McGraw-Hill, 1957 and also the work of Arons and Yennie, J. Acoust. Soc. Amer., Vol. 22, pp. 231–237, 1950 for lucid accounts of this phenomenon.

Figure 3:
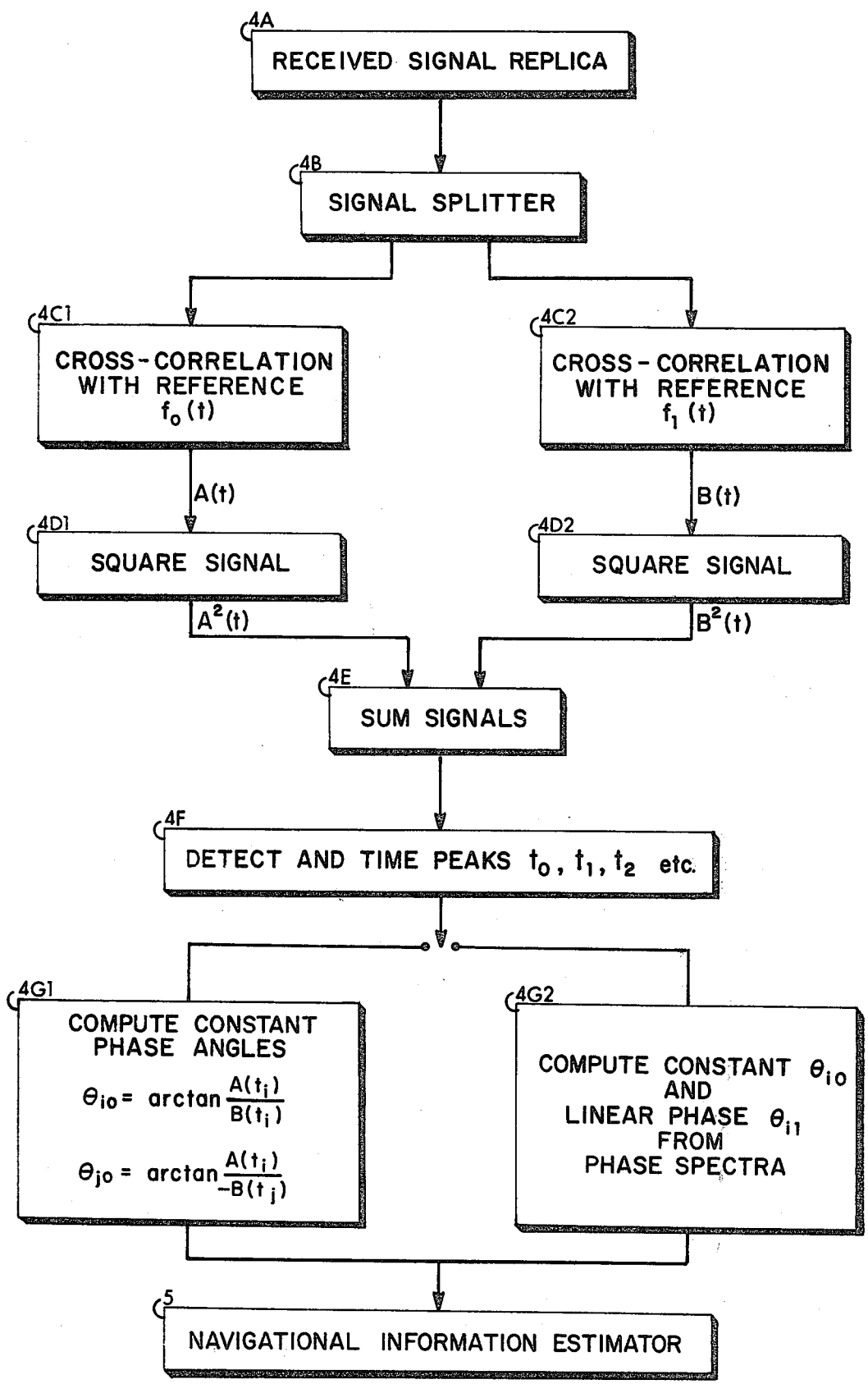
FIG. 3 shows a processing sequence for the embodiment of FIG. 2.

The navigational information for the generalized embodiment of FIG. 2 can be recovered by processing the received signal 3A through the processing sequencer 4 which is shown in detail in FIG. 3. In FIG. 3 each member signal of the pattern within each component signal must be identified and timed. The mathematical analysis of the operational sequence is given in my above-referenced patent. Such analysis describes how basic properties I through IV enable individual member signals to be identified and correctly retain arrival time and phase encoded angular coordinate information in spite of appreciable distortions which may be present owing to relative motion between the transmitter and receiver. Also, a phase-invariant quadrature matched-filter processing sequencer employing analogously design signals was described by Speiser and Whitehouse at a symposium on Spread Spectrum Communications held at the Naval Electronics Laboratory Center, San Diego, Mar. 13–16, 1973.

Member signals are identified for each of the significant peaks detected by element 4F. Arrival times can be computed for each member signal with the use of a time standard, however, signal transmission times only can be determined if the signal initiation times are known. The phases of the member signals can be computed using the alternatives cited as elements 4G1 and 4G2. If the method using arctangents of ratios of element 4G1 is elected, then if more than a single member signal is involved, these must be in quadrature. Again, the applicable analysis is given in my above-referenced patent.

Figure 4:
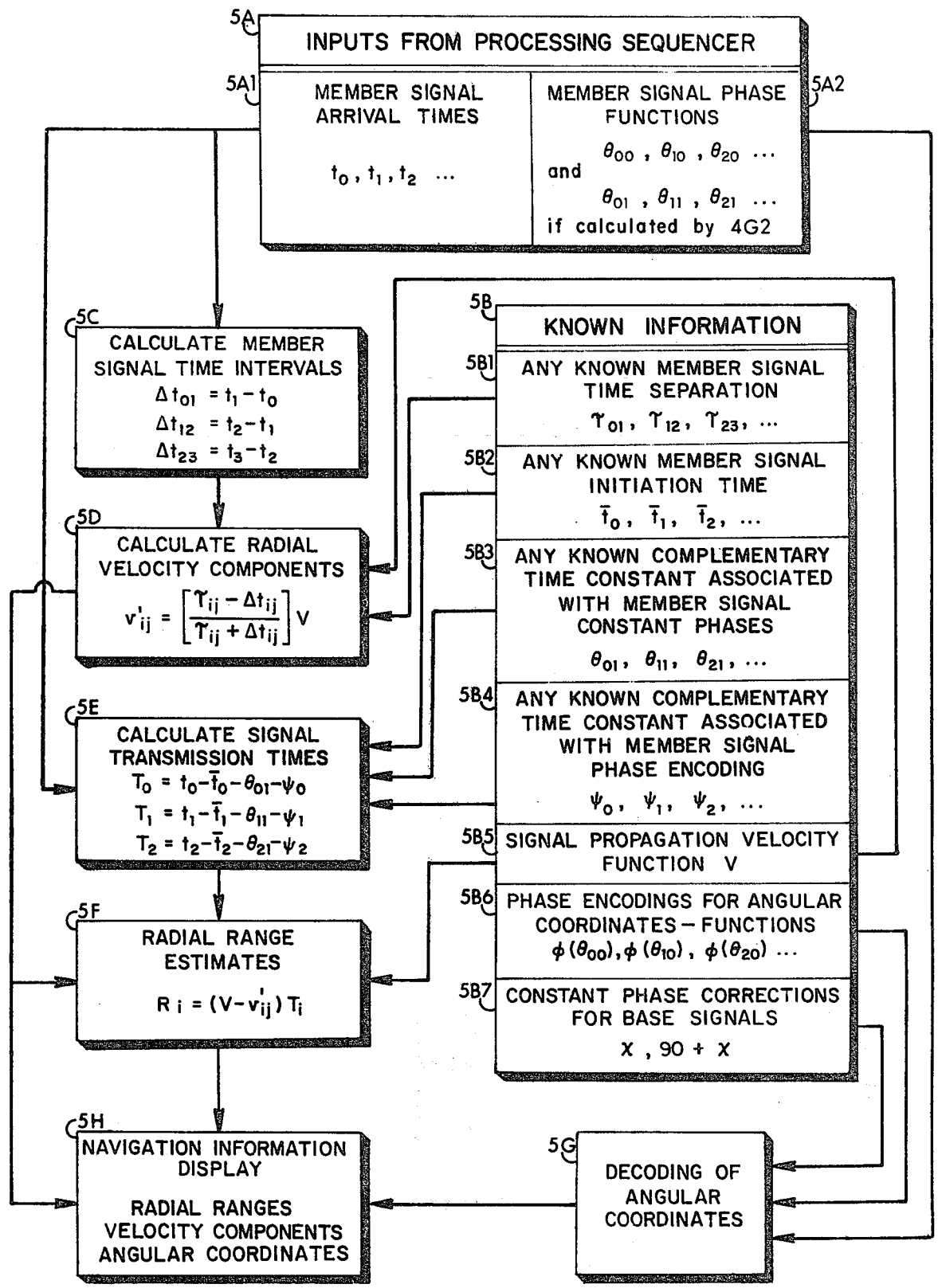
FIG. 4 shows the operations of the navigational information estimator of FIG. 3.

The navigational information estimator 5 of FIGS. 2 and 3 is outlined in detail in FIG. 4. In both FIGS. 3 and 4, a subscript, or the first subscript of a doubly subscripted quantity refers to the number of an individual member signal of the pattern within a component signal. Processing sequencer outputs 5A are both arrival times $t_i$ for the member signals and phase functions. Since the two term Taylor series expansion will be taken to approximate the phase functions, these quantities will consist of either the constant terms $\theta_{io}$ if the calculation of 4G1 is used, or both $\theta_{io}$ and $\theta il$, if the alternative 4G2 is selected. The constants are complementary in that should the $\theta_{il}$ not be determined as in the calculation of 4G1, they will nevertheless be known by prior measurement or theoretical calculation and so can be supplied by alternate means should this be required.

Element 5C of FIG. 4 calculates member signal interval times. If these interval times 5B1 are initially known, then in conjunction with the signal propagation velocity V 5B5, radial relative velocity components can be calculated according to element 5D. Signal transmission times can be computed from the member signal arrival times $t_i$ as in element 5E if member signal initiation times 5B2 are known. Such transmission time is corrected as indicated for phase terms linearly varying with frequency (elements 5B3, 5B4). Amongst such correction terms would be $\theta_{il}$ which are either measured or complementary known terms as previously discussed, and any linear phase terms of the encodings.

Radial Range estimates between transmitter and receiver can be made according to element 5F using any computed signal transmission times $T_i$ (from element 5E) and the signal propagation velocity. Provision is made in 5F for any known radial velocity component as may have been previously determined by element 5D.

The decoding of the angular coordinates of element 5G is relatively straightforward. First one corrects the measured constant phase for any constants introduced by the base signals (element 5B7). Such constants might result from the use of a pair of base signals rotated in phase by a constant $\chi$ from base signals as defined having symmetry and antisymmetry properties, respectively (Property IV). Also, the base signals used in the processing sequencer 4 may contribute constant phase modifications to the measured member signal measured phases.

If a single angular coordinate is encoded in each member signal, we need only associate the measured phase with the angular coordinate via the known code. Where more than one angular coordinate is encoded in each member signal, a somewhat more complex, but simultaneous decoding scheme must be employed as described in the echo location embodiment shown in FIG. 7 of my above-referenced patent. In this case at least one angular coordinate must be encoded differently in different member signals. Also, the codes used must be independent and at least sufficient in number to permit a simultaneous solution for the angular coordinates. If there are redundant codes, a least squares solution can be applied.

Since the case of more than one encoded angular coordinate may be difficult to visualize, the following exemplary circumstance may be considered. Assume that for two member signals which constitute a component signal, the measured constant phases $\theta_{oo}$ and $\theta_{1o}$ are determined. The two angular coordinates which are encoded are $\phi_o$ and $\phi_1$.

The constant phase encoding for $\phi_o$ will be taken as $\phi_o/h_o$ for both member signals, where $h_o$ is taken as a known constant. For $\phi_1$ on the other hand, the encoding will be $\phi_1/h_1$ for the first member signal and $\phi_1/h_2$ for the second one, where $h_1$ and $h_2$ are known constants.

Now, the measurements $\theta_{oo}$ and $\theta_{1o}$ may be related to $\phi_o \phi_1$, by the simply developed set of equations:

$$\theta_{00} = \frac{\phi_0}{h_0} + \frac{\phi_1}{h_1} \quad (4)$$
$$\theta_{10} = \frac{\phi_0}{h_0} + \frac{\phi_1}{h_2}$$

Simultaneous solution of equations (4) gives:

$$\phi_0 = \frac{h_0 h_1 \theta_{00} - h_0 h_2 \theta_{10}}{h_1 - h_2} \quad (5)$$
$$\phi_1 = \frac{h_1 h_2 (\theta_{10} - \theta_{00})}{h_1 - h_2}$$

which is the desired simultaneous decoding.

The embodiment of FIG. 2 was termed generalized for a variety of reasons. First, it was not stated whether the receiver of the transmitter was at the known location. Clearly, a navigation application requires that one of these be known. Next, it was not stated whether the component signal was sent off in response to interrogation or at regular intervals. Further, it is implied that the same or other transmitters can produce other component signals concurrently, and that these can be received and processed in analogous manner to give still other estimates of navigational information.

Since viable navigation systems of this type (as described by FIG. 2) may operate according to any or all of the possibilities cited above according to the principles already set forth, a more concrete illustration of one alternative will help in the visualization of the most general concept.

Figure 5:
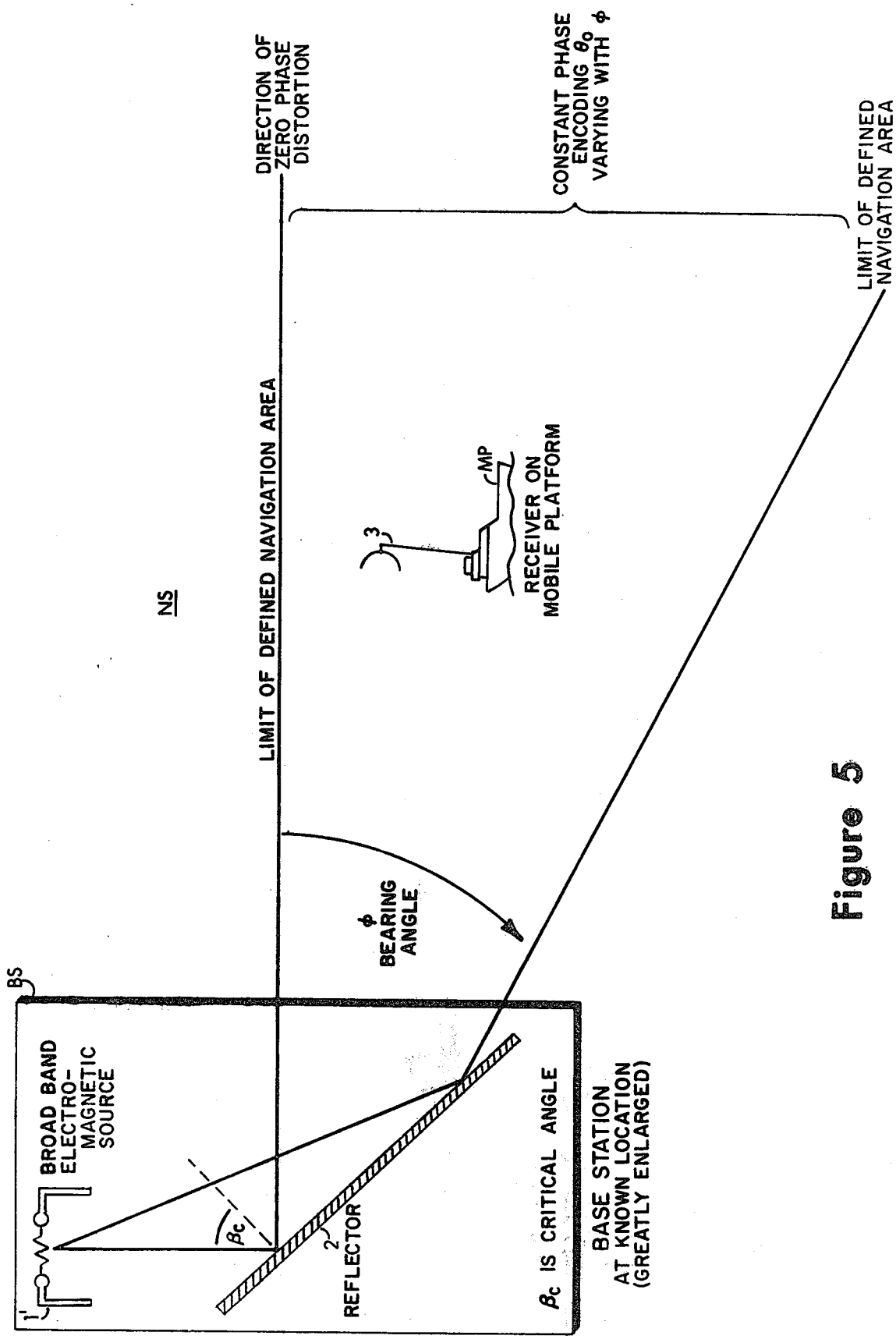
FIG. 5 shows an elementary electromagnetic area navigation system having a single base station.

FIG. 5 shows an elementary area navigation system NS having a single base station BS at a known location. Receivers 3 onboard mobile platforms MP will be able to establish bearing angle $\phi$, radial range, and radial velocity with respect to this base station.

The phase encoding of the bearing angle $\phi$ is established by reflective means 2, the critical angle for the particular reflective material being $\beta_c$. A broad band source 1' of pulsed electromagnetic radiation is required. Such a source might be designed employing principles analogous to the Travitron developed by Ikor, Inc., of Burlington, Massachusetts, which was reported in the New Scientist, p. 285, Aug. 6, 1970.

Source 1' sends binary encoded pulse trains of member signals which repeat on a five minute clock cycle that is precisely controlled. The pulse sequences are sent at five second intervals according to the code shown in FIG. 6. Note that the time of member signal initiation can be determined by simple recognition of the binary code. If a mobile platform remains stationary for several intervals at a known location, sufficient information will be received to calibrate a relatively low quality (and correspondingly inexpensive) time standard. With such a calibration achieved, the member signal initiation times are subsequently known.

Each of the component signal trains consists of no less than two member signals, and each signal is of a nature previously described (Properties I through IV). An appropriate frequency band in the case of electromagnetic near shore navigation might be 100–500 mhz.

Figure 6:
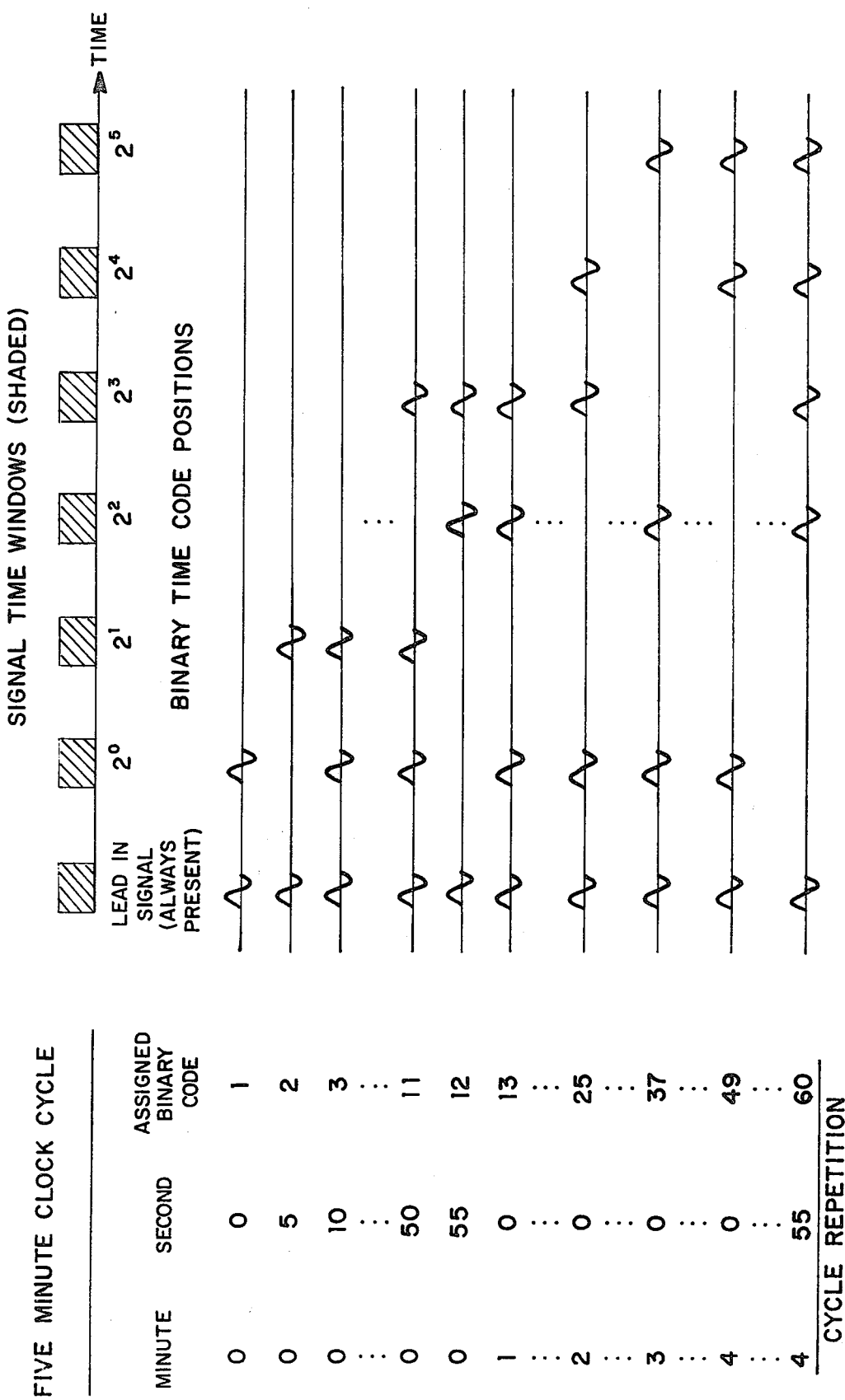
FIG. 6 shows binary encoded member signals at known intervals for establishing time references.

The system shown in FIGS. 5 and 6 thus requires no interrogation of the transmitter and can provide redundant navigational information by the conventional range-range approach, should there be additional base stations. We can further recognize from this exemplary case all of the essentials of the generalized embodiment of FIG. 2. The processing sequencer of FIG. 3 and the navigational information estimator of FIG. 4 are both specifically applicable.

Alternative implementations of the generalized embodiment using transmitter interrogations, or having known receiver locations and mobile transmitters, or employing only the encoding of angular coordinates will become readily apparent to those skilled in the art.

Again, it is important to emphasize that methods employing phase encoded angular coordinates may be used with conventional approaches such as the range-range operation, where more than one range determination may be made, and that standard statistical procedures for combining and upgrading the accuracy of redundant measurements may be employed.

It is useful at this point to relate features of the present invention to the considerations presented in the background for the invention. First, although member signals are pulse-like, they still are of sufficient duration to benefit from correlation detection, but also to suffer from Doppler distortions. Hence, a phase invariant correlation and detection scheme which complements the signal design is employed. If velocity information is desired more than one member signal is required. While sequences of member signals provide good redundancy and signal-to-noise ratio advantage, their very duration limits the ability to resolve changes in the relative velocity.

The defined class of signals have a remarkable ability to bear angular coordinate information as a distortion-resistant phase encoding. Several important practical advantages accrue to this invention owing to this ability and two particularly sophisticated extensions of the basic generalized embodiment of FIG. 2 will be given below.

Certain practical matters should be first taken into consideration. A rather standard approach to developing angular coordinate information is to scan in the sense of the angular coordinate with a narrow beam transmitter, as in the case of a conventional radar system. Use of the narrow signal beam allows great concentration of signal energy which has ensuing advantages in noisy environments. On the negative side however, the time duration of the scanning cycle may have portions of the navigation area without signal coverage for unacceptable time periods.

The system of my invention is omnidirectional or at least broad beam by nature. Any diminution of signal level accompanying this feature may be overcome by frequent repetition of the signal patterns over time and the development of statistical models relating the information from one time to the next. In fact, the work of R. E. Kalman as reported in the Journal of Basic Engineering (ASME Transactions), Vol. 82, Pages 35–45, 1960, and the subsequent work on Kalman filters by others offers an ideal analytical vehicle to update the navigation information display 5H of FIG. 4. My navigation system described herein would at no time leave the navigation area without signal coverage for any significant time period.

Also, the ability to label the signal transmission paths with angular coordinates will solve an important problem occurring in long range navigation systems using both electromagnetic and acoustic signals. For electromagnetic signals the skywave or ionospheric reflection sometimes may not be readily distinguished from directly transmitted signals. Submarine navigation systems similarly have multipath signal arrivals caused by reflections from the acoustic impedance layering of the sea, which again may not be conveniently distinguishable from direct transmission paths. If the direct signal paths could be distinguished from secondary paths in terms of an angular coordinate, then a new basis for identification of the direct signal is developed.

It follows from the ability to label signal transmission paths with angular coordinates, that a mobile unit such as shown in FIG. 5, once positioned, may position other mobile units relative to itself from their reflected signals or echoes. The transmitter and mobile unit carrying the receiver being at known locations constitute an echo location system.

Finally, one must consider the possibility that phase distortions may be impressed into the member signals by properties of the signal propagation medium itself. The presence of such distortions may not necessarily be anticipated or even recognized.

An excellent case in point involves the use of water as a propagation medium for acoustic signals centered around the frequency 1.2 mhz. Such transmissions are often used as small scale simulations of radar and microwave systems.

The following experimental study using the techniques of this invention documents and measures the hitherto undetected phase distortion or dispersive property of water at the cited frequency.

In this study, the constant phase term, which will be taken to characterize the phase effect of water as a dispersive transmission medium, was sought for the frequency band 0.95–1.45 mhz (roughly centered about 1.2 mhz). For the range of water transmission paths between 2 and 7 cm in length, the constant phase distortion was estimated to be 16.7°/cm. FIGS. 7, 8, 8a and 9 describe this particular study.

Figure 7:
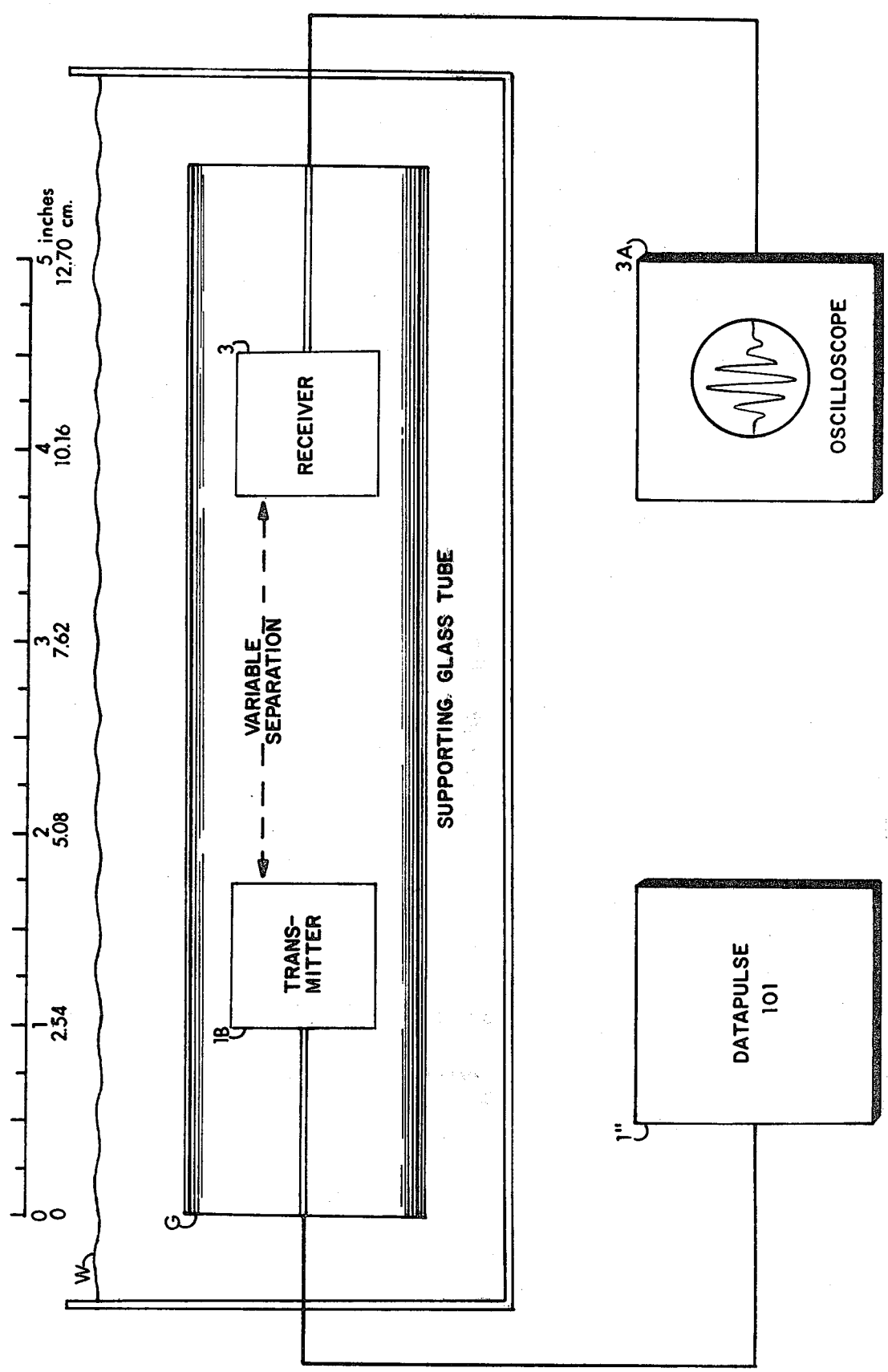
FIG. 7 shows an experimental apparatus used to characterize the phase distortion caused by the dispersive properties of water at 1.2 mhz.

FIG. 7 shows a schematic arrangement of the apparatus. A Datapulse 101 signal generator 1″ was used to drive a transmitting transducer 1B which sends a narrow acoustic beam to a receiving transducer 3 through water W in an immersed open glass tube G. Signal generator 1″ and transducer 3 were crystals having circular faces 1.905 cm diameter, while the glass tube inner diameter measured 3.175 cm. Received waveforms were recorded on Polaroid photographs from a Tektronix type 561A oscilloscope 3A. The waveforms were subsequently digitized at a sample interval of 0.122 μsec using a Wang calculator with an interfaced digitizer. The transmitted waveform was in the nature of a member signal.

Figure 8:
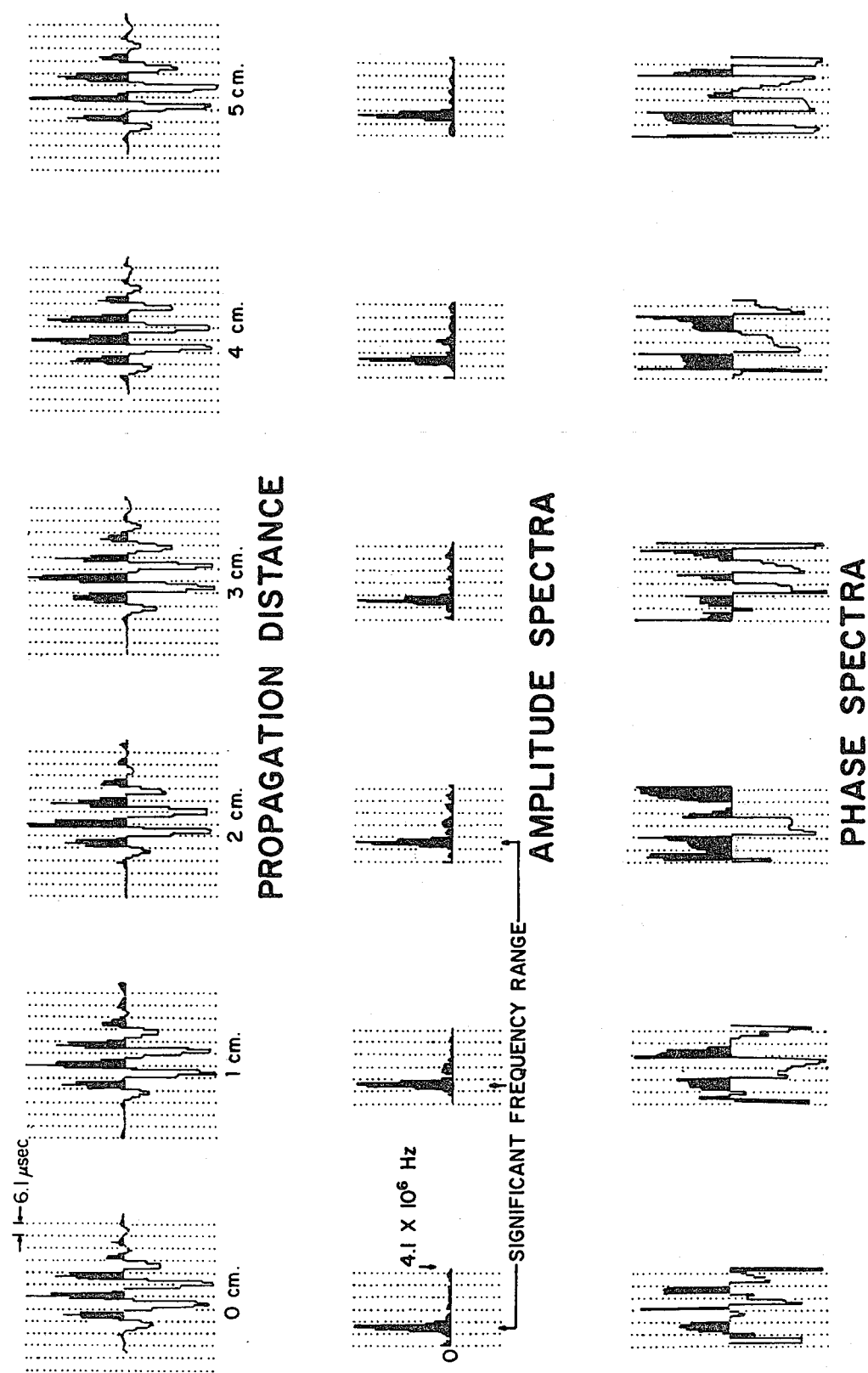
FIGS. 8 and 8a shows digitized received member signals for the apparatus of FIG. 7, after transmission through water, and their frequency analyses.

FIG. 8 shows plots of the digitized received member signal waveform for propagation distances from 0 to 10 cm through the water. Owing to the physical size of the transducer, only distances beyond 1.5 cm become representative of the far field signal transmissions. Also, owing to the transducer beam width, results beyond 7.5 cm may be expected to show tube sidewall interference effects.

Figure 8A:
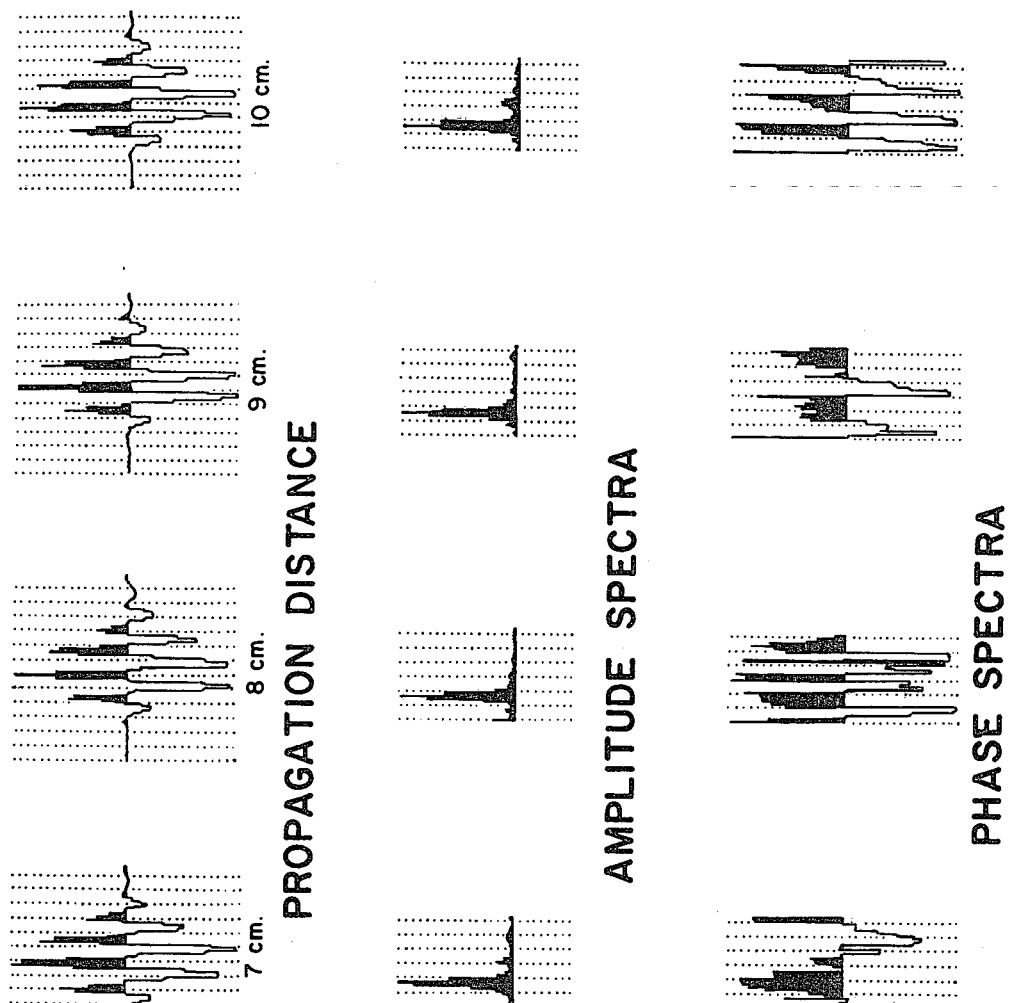

In FIGS. 8 and 8a, and phase spectra are also shown for the received member signals. The origins for the phase spectral calculations are the time samples at or just before the member signal origins as would be determined following the processing sequence of FIG. 3. In this case, the correlation operations 4C1, 4C2 of FIG. 2 are performed with a Klauder signal base pair occupying the frequency band of 0.89 to 1.48 mhz and the origins selected are based on the peak times identified by element 4F. Hence the phase spectra and the identification of characteristic constants over the significant frequency band represent the operations of element 4G2. The simple behavior of the phase spectra over the significant frequencies which results from appropriate choice of the member signal origins will be appreciated.

Figure 9:
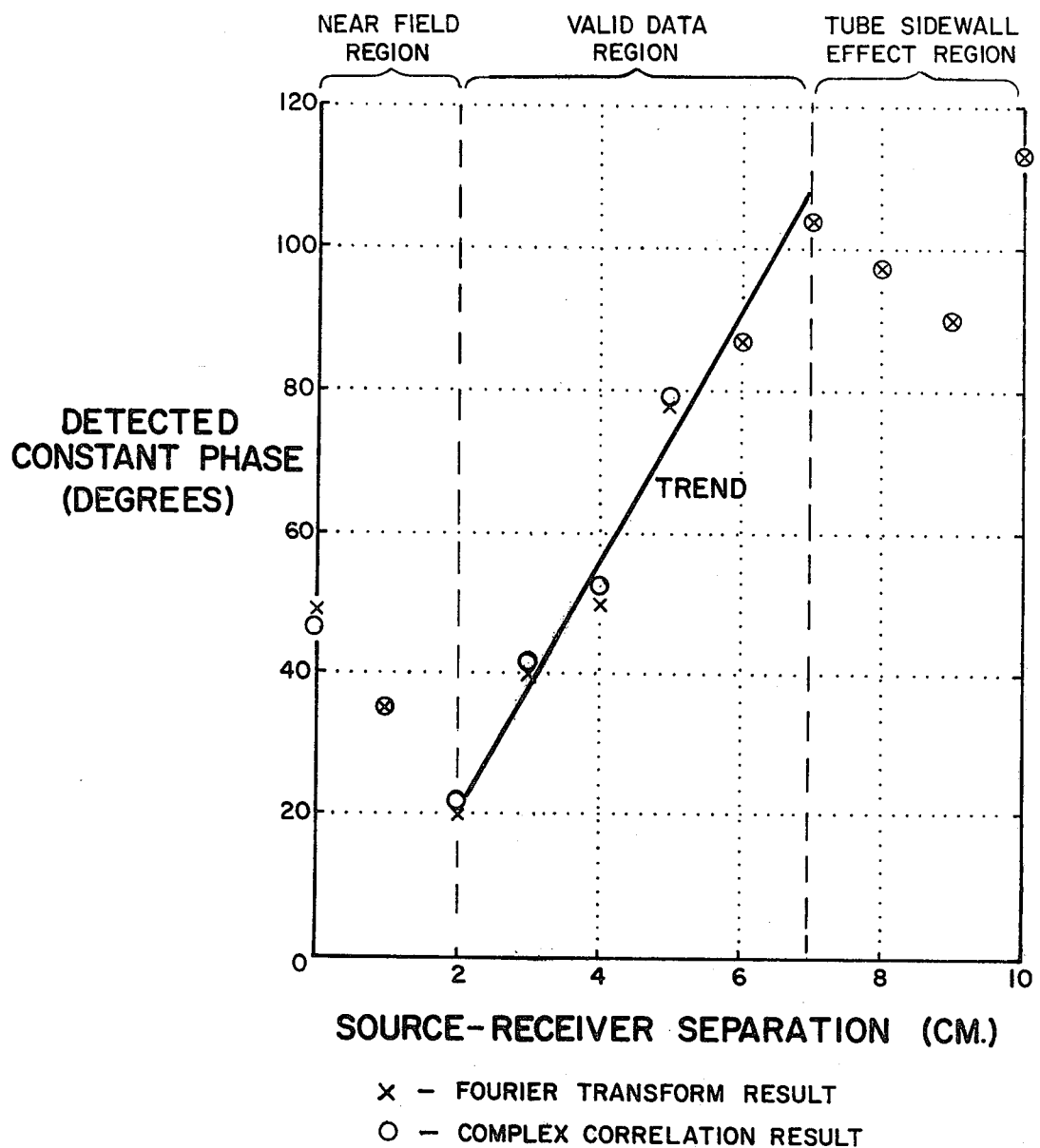
FIG. 9 shows experimental results indicating the relationship of the phase distortion of member signals at 1.2 mhz with their propagation distance through water.

In FIG. 9 the detected constant phases as calculated from the phase spectra over the band of significant frequencies (FIG. 8 and element 4G2 of FIG. 3) are plotted against the propagation distance, as are the constant phases computed according to element 4G1 of FIG. 3. The two calculations produce remarkably similar results, which imply a simple linear relationship between the constant phase distortion (imparted by the water) and the propagation path length. As stated earlier, the slope of this relationship is estimated to be 16.7°/cm of travel.

Hence, if signal phase distortions are present in the propagation medium, as described, the following description will provide an embodiment for a navigation system which can measure such distortions and correct for them accordingly. The essentials for this embodiment have much in common with the method employed to encode more than one angular coordinate in a component signal.

For this embodiment the phase distortions imparted by the medium are treated as one additional encoded angular coordinate. If sufficient redundancy is designed into the component signal, and a sufficient number of the encodings including the medium phase distortion are mathematically independent, then the medium phase distortion will be developed as a part of the same simultaneous calculation for the angular coordinates. A specific illustration will help clarify this general concept.

Assume that two member signals constitute the particular component signal, and that the measured constant phases after processing according to FIG. 3 are $\theta_{oo}$ and $\theta_{10}$. The single angular coordinate $\phi_o$ is phase encoded as $\phi_o/h_o$ in the first member signal and as $\phi_o/h_1$ in the second one. A medium induced phase distortion $\phi_m$ is present in both member signals which have travelled over the same path.

The following equations relate the measurements $\theta_{oo}$ and $\theta_{10}$ to the desired quantities $\theta_o$ and $\theta_m$:

$$\theta_{00} = \frac{\phi_0}{h_0} + \phi_m \quad (6)$$

$$\theta_{10} = \frac{\phi_0}{h_1} + \phi_m$$

Solving equations (6) gives:

$$\phi_0 = \frac{h_0 h_1 (\theta_{00} - \theta_{10})}{h_1 - h_0} \quad (7)$$

$$\phi_m = \frac{h_1 \theta_{10} - h_0 \theta_{00}}{h_1 - h_0}$$

If $\phi_m$ is calculated for many ranges, the phase distortion of the medium can be rather simply characterized. Alternatively, if $\phi_m$ is believed to relate to the range in a functionally known manner and range estimates are available, then the decoding equations can be reformulated to directly estimate the parameters of the functional relationship.

In sum, navigation systems which embody elements of the invention described herein offer several novel and highly desirable and useful alternatives for addressing the compromises which inevitably must be faced in developing area navigation systems.

What is claimed is:

1. In a method of ascertaining for at least one mobile unit, navigational information in terms of at least one angular coordinate, radial ranges, and relative velocity components, by transmitting from at least one transmitter and receiving with at least on receiver, at least one component signal in a medium of known propagation velocity, characterized by:

forming each said component signal to consist of at least one member signal, all said component signals being separable;

phase encoding in at least one said member signal a distinction in phase according to at least one angular coordinate;

receiving said component signals, separating them, and identifying within each said component signal each individual member signal;

measuring phases for each one of said identified member signals;

decoding each said angular coordinate from said measured phases and said encodings produced by said encoding step;

measuring signal transit times for any member signal having a known time of initiation;

measuring interval times between member signals for any member signals whose interval time is initially known;

forming corrected measured signal transit times and interval times by compensating each so formed time for any linear elements in said phase encodings;

producing mobile unit relative velocity components from any said corrected measured interval times;

producing mobile unit radial ranges from any corrected signal transit times, and correcting any said radial ranges for any known relative velocity components.

2. The method of claim 1 characterized in that a phase distortion produced by properties of the signal propagation medium is present in each member signal, the medium phase distortion being independent of all other phase encodings, the number of independent encodings being at least equal to one more than said number of angular coordinates, and obtaining said medium phase distortions from said measured phases and said known phase encodings.

3. The method of claim 1 characterized in that for at least one mobile unit which has established its location from said navigational, reflected component signals from other mobile units are used to establish their positions in relation to said mobile unit of established location.

4. The method according to claim 1 characterized in that phases are measured for identified member signal phase spectra.

5. The method of claim 1 characterized in that said angular coordinate is encoded as a phase distortion introduced by propagating the transmitted component signal through a medium having dispersive properties which vary in relation to the angular coordinate.

6. The method of claim 1 characterized in that said angular coordinate is encoded as a phase distortion introduced by reflecting the transmitted component signal from a surface positioned beyond the critical angle in relation to the angular coordinate.

7. The method according to claim 1 characterized in that each component signal has defined polarization character, the member signals of each component signal being formed as a weighted sum of a design base signal pair, a pair of base signals substantially being in quadrature and sharing a common smooth and essentially unimodal amplitude spectrum occupying a contiguous band of frequencies, choosing design base signal pairs for each component signal such that component signals are separable by the logical sum of an distinction in polarization character, frequency content and member signal pattern, separating received component signals and forming replicas for processing, processing said replicas by cross-correlating with detection base signal pairs, thereby producing a pair of correlation component functions for each component signal, said detection base signal pairs having properties analogous to said design base signal pairs, but with counterpart design and detection base signal pairs overlapping in frequency by a band greater in width than any frequency shift attributable to mobile unit relative motions, the difference in phase angle at any common frequency being substantially a constant and a complementary second constant multiplying the frequency, forming for each received component signal a correlation amplitude function from term-by-term sums of the absolute values of the correlation component function pairs, said absolute values being raised to a like power not less than one and raising said sums to a power greater than zero but less than one, and identifying from the maxima of the correlation amplitude function individual member signals.

8. The method according to claim 7 characterized in that for at least one component signal a single angular coordinate is encoded as a phase distortion which is substantially a constant and a complementary second constant multiplying the frequency;

developing member signals for said component signals and processing said component signals using design and detection base signal pulses, individual base signal pulses having the further property that the phases at all significant frequencies are substantially a constant and a complementary second constant multiplying the frequency;

measuring the constant phases of individual member signals in said received and processed component signals;

correcting said measured constant phases for the constant phase values of the base signal pulses;

decoding said angular coordinates from said corrected constant phases, and forming further corrected signal transit times and interval times for member signals of said component signals by compensating said times for any linear phase elements of the base signal pulses as given by the complementary second constants.

9. The method according to claim 8 characterized in that said constant phases are measured from identified member signal phase spectra.

10. The method of claim 8 characterized in that said angular coordinate is encoded as a phase distortion introduced by propagating the transmitted component signal through a medium whose dispersive properties vary in relation to the angular coordinate.

11. The method of claim 8 characterized in that said angular coordinate is encoded as a phase distortion introduced by reflecting the transmitted component signal from a surface positioned beyond the critical angle in relation to the angular coordinate.

12. The method according to claim 8 characterized in that the constant terms of the phase encodings are measured from arctangent functions of ratios formed from values of identified member signals at times corresponding to maxima of the correlation amplitude function, any pair of said values being appropriate to forming a ratio when the corresponding member signals travel the same path and are in quadrature.

13. The method of claim 8 characterized in that at least one component signal consists of more than one member signal, and more than one angular coordinate is encoded in said component signal, each phase encoding being substantially a constant and a complementary second constant multiplying the frequency, so that for at least one said angular coordinate the encoding is distinct for at least one member signal, said encodings being independent and being at least equal in number to the number of angular coordinates, and obtaining said angular coordinates from said measured phases and said phase encodings.

14. The method of claim 8 characterized in that a phase distortion produced by properties of the signal propagation medium is present in each member signal, the medium phase distortion being independent of all other phase encodings, the number of independent encodings now being at least equal to one more than said number of angular coordinates, and obtaining also said medium phase distortions from said measured constant phases and said phase encodings.

15. The method of claim 13 characterized in that a phase distortion produced by properties of the signal propagation medium is present in each member signal, the medium phase distortion being independent of all other phase encodings, the number of independent encodings being at least equal to one more than said number of angular coordinates, and obtaining also said medium phase distortions from said measured constant phases and said phase encodings.

16. The method of claim 8 characterized in that for at least one mobile unit which has established its location from said navigational information, reflected component signals from other mobile units are used to establish their positions in relation to said mobile unit of established location.

17. The method of claim 13 characterized in that for at least one mobile unit which has established its location from said navigational information, reflected component signals from other mobile units are used to establish their positions in relation to said mobile unit of established location.

18. In a method of ascertaining for at least one mobile unit, navigational information in terms of at least one angular coordinate by transmitting from at least one transmitter and receiving with at least one receiver, at least one component signal, characterized by:
(1) forming each component signal to include at least one member signal, all such component signals being separable;
(2) phase encoding, during travel between the at least one transmitter and at least one receiver, a distinction in phase in at least one member signal according to at least one angular coordinate;
(3) receiving the component signals, separating them, and identifying within each component signal each individual member signal;
(4) measuring phases for each one of the identified member signals,
(5) decoding each angular coordinate from the measured phases and the encodings produced by said step of phase encoding; and
(6) ascertaining the navigational information from each decoded angular coordinate.

* * * * *